Figure 1:
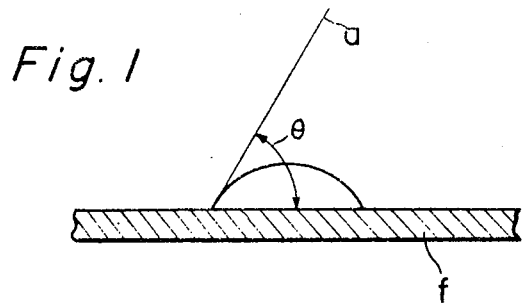

United States Patent [19]

Adachi et al.

[11] 3,950,206

[45] Apr. 13, 1976

[54] METHOD FOR HEAT-BONDING POLYESTER FILMS OR SHEET-LIKE STRUCTURES AND SAID POLYESTER FILMS OR SHEET-LIKE STRUCTURES

[75] Inventors: Tomio Adachi, Sagamihara; Yukio Mitsuishi, Machida; Rikuo Miura; Hideaki Kawakami, both of Sagamihara, all of Japan

[73] Assignee: Teijin Limited, Osaka, Japan

[22] Filed: Dec. 10, 1973

[21] Appl. No.: 423,553

[30] Foreign Application Priority Data

Dec. 15, 1972 Japan.............................. 47-125212

[52] U.S. Cl. ................ 156/272; 156/307; 428/409; 428/480; 428/910; 428/516; 428/474; 428/523; 250/324

[51] Int. Cl.² .................... B29C 27/04; B32B 27/06

[58] Field of Search ............ 156/272, 307; 161/164, 161/402, 412; 250/324 X; 428/910, 409, 480, 482

[56] References Cited

UNITED STATES PATENTS

| | | | |
|---|---|---|---|
| 2,876,186 | 3/1959 | Wolinski | 161/412 |
| 2,876,358 | 3/1959 | Root | 156/272 |
| 3,081,214 | 3/1963 | Strime | 156/272 |
| 3,188,265 | 6/1965 | Charbonneau | 156/272 X |
| 3,329,549 | 7/1967 | Vilutis | 156/272 |
| 3,647,592 | 3/1972 | Woodberry | 156/272 X |
| 3,823,061 | 7/1974 | Frayer | 156/272 X |
| T888,001 | 7/1971 | Drake, Jr. | 156/272 |

*Primary Examiner*—George F. Lesmes
*Assistant Examiner*—Ellis P. Robinson
*Attorney, Agent, or Firm*—Sherman & Shalloway

[57] ABSTRACT

A method for heat bonding a polyester film directly with other film or shaped articles of polyester at a temperature below its melting point by using corona discharge treated polyester film, said polyester being predominantly alkylene terephthalate units and/or alkylene 2,6-naphthalate units and the film therefor.

3 Claims, 4 Drawing Figures

Tg: GLASS TRANSITON TEMPERATURE
Tm: MELTING POINT

METHOD FOR HEAT-BONDING POLYESTER FILMS OR SHEET-LIKE STRUCTURES AND SAID POLYESTER FILMS OR SHEET-LIKE STRUCTURES

This invention relates to a method for directly heat-bonding polyester films or sheet-like structures to each other or to other shaped articles of polyester, and polyester films or sheet-like structures used in this method.

Polyester films have poor adhesiveness because of their crystallinity, and even for bonding with an adhesive therebetween, it has been the practice to treat the surfaces of the films by various methods in order to render them active, for example by treating the surfaces with various chemicals, or by subjecting the surfaces to the radiation of actinic rays or to corona discharge. However, it has been not easy to obtain bonded articles of polyester films without adversely affecting the desirable properties of the films themselves. This is because the physical properties of the adhesive are inferior to those of the polyester film, and thus, the bonded article is inferior to the base polyester film in mechanical characteristics, chemical resistance, and heat resistance.

Polyethylene films can be directly heat-bonded to each other without any material therebetween by merely superimposing the polyethylene films and heating them to a temperature above the melting point of the films.

Polyester films have considerably different physical properties from those of the polyethylene films, and an attempt to superimpose polyester films and heat them to a temperature above the melting point of the polyester only results in a product which is useless in practical applications. When a polyester is heated to a temperature above its melting point and then cooled, the molecules are crystallized in the non-oriented state to form a very brittle structure. Usually, polyester films are in the oriented and crystallized state, but when they are melted, the orientation is removed, and the characteristics of the films become markedly poor. In particular, it has not been proposed previously to heat-bond films of a polyalkylene terephthalate or polyalkylene-2,6-naphthalate directly to each other at a temperature below the melting point of the polyester in order not to worsen the physical properties of the films.

It has now been found that when one or both surfaces of a polyester film or sheet-like structure are subjected to corona discharge, and bonded to the surfaces, which have been treated, or not treated with, corona discharge, of another film or sheet-like structure or another shaped article of the polyester, they can be heat-bonded at a temperature below the melting point of the polyester. Since the bonding is effected at a temperature below the melting point of the polyester, no deterioration in the physical properties of the films is caused by the removal of the orientation of the films. Furthermore, it has been found that the bond strength of the resulting bonded article is very high, and this superior bond strength cannot be expected from bonded articles obtained by heat-bonding polyethylene films at a temperature above the melting point of the polyethylene, or by heat-bonding polyethylene films which have been treated with corona discharge at a temperature below the melting point of the polyethylene, or by heat-bonding polyester films at a temperature above the melting point of the polyester, or treating polyester films with chemicals and then heat-bonding them.

Accordingly, an object of this invention is to provide a method for directly heat-bonding films or sheet-like structures of a polyester composed mainly of alkylene terephthalate and/or alkylene-2,6-naphthalate units to each other or to another shaped article of the polyester without interposing an adhesive or other material there-between to obtain a bonded article of high bond strength.

Another object of this invention is to provide polyester films or sheet-like structures for use in directly heat-bonding to a polyester shaped article, in which the polyester is composed mainly of alkylene terephthalate and/or alkylene-2,6-naphthalate units.

Many other objects of this invention along with its advantages will become apparent from the following description.

The polyester which constitutes the films or sheet-like structures of this invention, such as film, sheet, tape, woven cloth, knitted cloth, or non-woven cloth, is a polyester composed mainly of a poly(alkylene terephthalate) and/or poly(alkylene-2,6-naphthalate) which has hitherto been not expected to be directly heat-bondable.

Specifically, this polyester is one selected from the group consisting of (i) a polyester in which at least 80 mol % of the recurring units consists of alkylene terephthalate units, (ii) a polyester in which at least 80 mol % of the recurring units consists of alkylene-2,6-naphthalate units, (iii) a blend of (i) and (ii) in which at least 80 mol % of the total recurring units consists of alkylene terephthalate units and alkylene-2,6-naphthalate units, and (iv) a mixture of a member selected from (i), (ii) and (iii) with another thermoplastic resin in which at least 90 mol % of the total recurring units consists of the alkylene terephthalate units and the alkylene-2,6-naphthalate units.

The aromatic polyester is highly crystalline, and these polyester films or sheet-like structures have extremely low surface activities. It has never been attempted to heat-bond them directly at a temperature below the melting point of the polyester.

Specific examples of the crystalline aromatic polyester are polyesters in which alkylene terephthalate units or alkylene-2,6-naphthalate units account for at least 80 mol % of the recurring units, and the blends or mixtures of these mentioned above. These polyesters can be prepared in a known manner from polyester-forming dihydroxy compounds such as ethylene glycol, propylene glycol, tetramethylene glycol, pentamethylene glycol or hexamethylene glycol or polyester-forming derivatives of these, and terephthalic acid or naphthalene-2,6-dicarboxylic acid, or their polyester-forming derivatives.

These polyesters may contain not more than 20 mol % of another acid component. Examples of the acid component are compounds having a divalent ester-forming functional group, for example, dicarboxylic acids such as oxalic acid, adipic acid, phthalic acid, isophthalic acid, terephthalic acid, naphthalene-2,6-dicarboxylic acid, naphthalene-2,7-dicarboxylic acid, succinic acid or diphenyl ether dicarboxylic acid, or lower alkyl esters of these, hydroxycarboxylic acids such as p-hydroxybenzoic acid or p-hydroxyethoxybenzoic acid, or their lower alkyl esters. They may also be those whose terminal hydroxyl groups and/or carboxyl groups are capped by a monofunctional compound such as benzoic acid, benzoylbenzoic acid, benzyloxybenzoic acid or methoxypolyalkylene glycols. Or they may be those modified with a small amount of a trifunctional ester-forming compound such as glycerine or pentaerythritol within the range where a substantially linear copolymer is obtained.

The thermoplastic resin used in the mixture (iv) above may, for example, be polyethylene, polypropylene, polystyrene, polyamides such as nylon 6, nylon 66 or nylon 12, and polycarbonate.

The polyester may contain various additives that can be generally incorporated in the polyester films or sheet-like structures, for example, a delusterant such as titanium dioxide, finely divided silica or clay, a lubricant, a stabilizer such as phosphoric acid, phosphorous acid or its esters, or a dye or pigment.

Preferably, the polyester film to be treated with corona discharge has a density of 1.38 to 1.41 g/cm³ (in the case of polyethylene terephthalate), and 1.35 to 1.37 g/cm³ (in the case of polyethylene-2,6-naphthalate). The density was measured at 23°C. There is a tendency that especially high bond strength can be obtained when polyethylene terephthalate has a density of not lower than 1.395, preferably not lower than 1.400, more preferably not lower than 1.405, and the polyethylene-2,6-naphthalate has a density of not lower than 1.356, preferably not lower than 1.360. On the other hand, when the density of the polyethylene terephthalate is less than 1.395, preferably less than 1.390, the heat-pressing time for heat bonding can be shortened. In the case of the polyethylene-2,6-naphthalate, the heat-pressing time for heat bonding can be shortened when the density is less than 1.356, especially less than 1.354. The density of the polyester film should be selected according to the desired bond strength and the desired heat bonding time.

Where it is desired to obtain an especially high bond strength and shorten the bonding time, the surface roughness of the heat-bonding films treated with corona discharge is adjusted to not more than 0.3 micron, preferably not more than 0.2 micron, especially preferably not more than 0.15 micron.

The surface roughness is defined as follows: The surface roughness of the sample film along a length of 2.5 mm is measured under a load of 0.1 g using a contact needle-type surface roughness tester with the tip of the contact needle having a radius of 2.5 $\mu$. From the chart obtained, the surface roughness is expressed by the 10-point height stipulated in JIS B0601, which is in practice the same as the 10-point height stipulated in ISO R468.

The polyester film or sheet-like structure to be treated with corona discharge in the present invention may be in the unstretched-unoriented state, stretched-oriented state, or stretched-heatset state. Outstanding heat-bondability can be imparted even to those structures which have been stretched and oriented or stretched, oriented and then heat-treated and which have previously been especially difficult to bond.

The corona discharge treatment itself is well known, and can be performed using a high frequency generating device. Preferably, by properly choosing the discharge conditions such as the treating voltage, the treating current, the treating time, or the distance between the electrodes, the corona discharge treatment of the film or sheet-like structure is carried out so that the contact angle of the treated surface with respect to water (defined by the method to be described) is not more than $(\theta - 5°)$ in which $\theta$ is the contact angle of the untreated film or structure, preferably not more than $(\theta - 10°)$. Usually, it is preferred that the corona discharge treatment be performed so that the contact angle becomes $(\theta - 45°)$ to $(\theta - 10°)$. Usually, a voltage of about 1 to 20 KV, a treating time of 0.001 to 1 second, an interelectrode space of about 0.1 – 5 mm, and a power consumption of about 0.01 to 100 kilowatt.sec. per m² of the film can be employed.

Usually, the corona discharge treatment is carried out at room temperature in air, but if desired, it may be carried out in an atmosphere of other gases such as nitrogen or carbon monoxide. Furthermore, if desired, the temperature may be raised or lowered within a range of −50°C. to a point 10°C. lower than the melting point of the polyester, for example.

The contact angle is measured as follows with reference to FIG. 1 attached to the present specification. A drop of distilled water is placed on a sample film maintained horizontal so that the diameter of the contact circle is 1 to 2 mm. After a lapse of one minute, the water drop is observed in the horizontal direction from the side, and the angle formed between the tangential line $a$ and the film $f$, as is shown in FIG. 1, is measured at 23°C. and at a relative humidity of 60 %. This angle $\theta$ is defined as the contact angle of the film.

In the present invention, a polyester film or sheet-like material one or both surfaces of which have been subjected to a corona discharge treatment is directly heat bonded to a shaped article of the same or different kind of polyester as or from the above polyester in the manner described above with high bond strength. In effecting the bonding, the corona discharge treated surface of the polyester film or sheet-like material is brought into direct contact with the other film or sheet-like structure or other shaped article of the polyester. The surface of the latter film or sheet-like material or shaped article may, or may not, be subjected to a corona discharge treatment.

The heat bonding is carried out at a temperature above the glass transition point of the polyester but below its melting point. Preferably, it is carrried out at a temperature ranging from a point 20°C. higher than the glass transition temperature of the polyester to a point 10°C. lower than its melting point. If the temperature is below the glass transition temperature, it is difficult to obtain good bond strength, and if the temperature exceeds the melting point, the shape of the film or sheet-like structure is deformed to disadvantage. If there is a difference in glass transition temperature or melting point between the two polyester films or sheet-like structures to be bonded to each other, the glass transition temperature described above should be that of the polyester having a lower transition temperature, and the melting point described above should be that of the polyester having a lower melting point.

In order to exclude the intrusion of air into the bonded part and to ensure firm bonding, the heat bonding is preferably carried out at an elevated pressure, usually at a pressure of 0.01 to 20 Kg/cm². Where a laminate film is to be prepared by the lamination method, the heat bonding can be effected by passing films through nip rolls consisting of a heated metal roll and a rubber roll. When the films are to be heat sealed, the heat bonding can also be effected by a heat sealer which has conventionally been used for polyethylene films, for example. Furthermore, if a polyester tape in accordance with this invention is coiled around a metal rod in a spiral form and heated, the tubular film covering the metal rod can be obtained by being bonded through the shrinkage stress of the tape. When the metal rod is removed, a tubular film can be obtained.

If a proper heat bonding temperature is selected there can be obtained a strippable film by the process of this invention. A bonded polyester film has the property of being easily strippable by contact with water at room temperature if the bonding temperature is below a point 70° to 80°C. higher than its glass transition temperature, but can be used for applications where there is no contact with water. But by utilizing this phenomenon, the film can be utilized as a strippable film for a surface protective layer, for example.

If the bonding temperature of the polyester is above a point 60°C. lower than its melting point, no unusual change is observed in the bonded article even when it has been immersed in boiling water for 60 minutes. Although somewhat depending on the temperature, the bonding pressure may be one which does not permit the intrusion of air bubbles in the case of lamination of films or sheets, and in the case of a porous substance, it may be a contact pressure.

The method of this invention makes it possible to produce thick films (not only two-layered structure but also a multilayered structure having three or more layers). Previously, the thickness of biaxially oriented films of polyester have been restricted to a maximum of about 0.3 mm because of restrictions on equipment such as a tenter. However, according to this invention, a biaxially oriented polyester film having a thickness of more than 0.3 mm, for example, 0.5 mm or 1 mm can be easily produced, and because no adhesive is used, the resulting film can maintain the same characteristics as those of a single film. Furthermore, the method of this invention is suitable for imparting heat-sealability to the films. In an electrically insulating base material composed of the film bonded to a cloth, an improvement of oil affinity of the treated cloth, for example, can be expected.

It is not necessary to bond the film immediately after corona discharge. It has been found that when the films are bonded by the method of this invention after a lapse of 5 months from the corona discharge treatment, an attempt to peel off the films from each other results in fracture of the base material.

Figure 2:
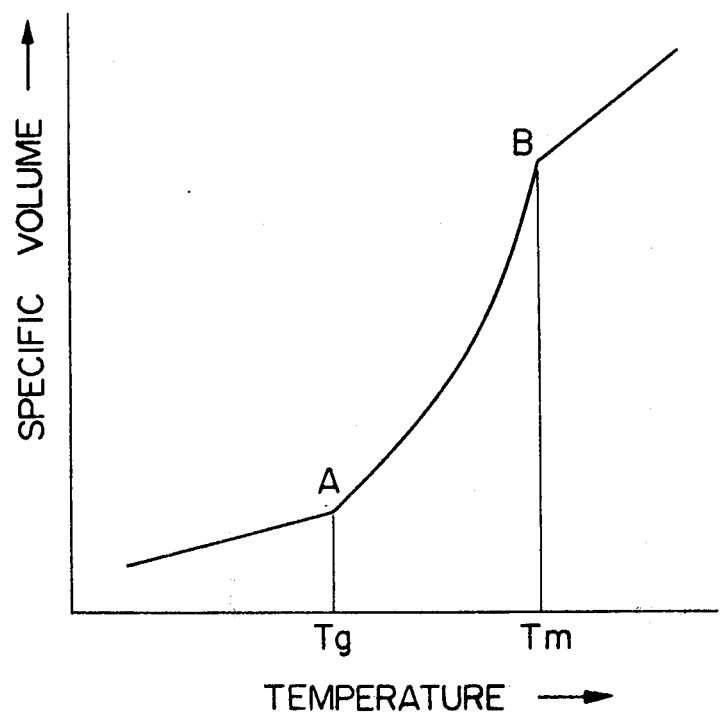

The glass transition temperature and the melting point are determined as follows:

In accordance with the thermal expansion measuring method stipulated in ASTM D-864, the relation between the specific volume and the temperature of a sample polyester article. As shown in FIG. 2, the point A at which the coefficient of thermal expansion abruptly changes is defined as the glass transition temperature of the polyester article, and the point B at which the melting of the crystals is over and the specific volume begins to increase gradually is defined as the melting point.

The following Examples illustrate the present invention.

EXAMPLES OF COMPARATIVE EXAMPLES

1. Each of a 25 $\mu$-thick biaxially oriented polyethylene terephthalate (PET) film having a density of 1.402 g/cm$^3$, and a polyethylene-2,6-naphthalate (PEN) film having a density of 1.361 g/cm$^3$ which had been prepared by conventional methods was treated with corona discharge at varying discharge voltages to form films having the water contact angles shown in Table 1.

Two sheets of each of the films obtained were heat bonded at the temperature shown in Table 1 and a pressure of 3 Kg/cm$^2$ for a period of 2 seconds. The width of the bonded part was 4 mm.

Figure 3:
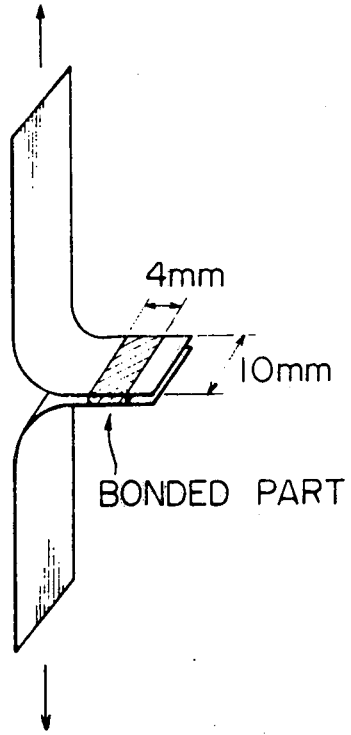

A rectangular test piece having a width of 1 cm was cut out from the film at right angles to the bonded part, as shown in FIG. 3. The two films of this test piece were pulled vertically by a tensile tester so as to peel off the films from each other. The tensile load was measured. The pulling speed was 100 mm/min. The results are shown in Table 1.

Table 1

| Run No. | Film | Water contact angle (°) | Heat bonding temperature (°C.) | Peel strength (g/cm) | Remarks |
| --- | --- | --- | --- | --- | --- |
| 1 (Comp.) | PET | 69 | 210 | 0 | Not treated with corona discharge |
| 2 (Comp.) | " | 69 | 150 | 0 | " |
| 3 (Comp.) | " | 66 | 210 | 0–10 | |
| 4 (Comp.) | " | 66 | 150 | 0–10 | |
| 5 (Ex.) | " | 41 | 210 | 400 | |
| 6 (Ex.) | " | 41 | 150 | 350 | |
| 7 (Ex.) | " | 69/41 | 150 | 300 | Only one surface treated with corona discharge |
| 8 (Comp.) | " | 41 | 50 | 0 | |
| 9 (Comp.) | " | 36 | 150 | 0 | Treated with a chemical |
| 10 (Comp.) | PEN | 70 | 220 | 0 | Not treated with corona discharge |
| 11 (Comp.) | " | 70 | 170 | 0 | " |
| 12 (Ex.) | " | 39 | 220 | 390 | |
| 13 (Ex.) | " | 39 | 170 | 320 | |
| 14 (Comp.) | " | 39 | 70 | 0 | |
| 15 (Comp.) | " | 37 | 170 | 0 | Treatment with a chemical |
| 16 (Comp.) | PE | 90 | 50 | 0 | Not treated with corona discharge |
| 17 (Comp.) | " | 45 | 50 | 10 | |

Note: The abbreviations used in Table 1 are as follows:

PET  polyethylene terephthalate
PEN  polyethylene-2,6-naphthalate
PE   polyethylene
Ex.  Example
Comp. Comparative Example These PET, PEN, and PE had a glass transition temperature of 75°C., 113°C., and −25°C. respectively, and a melting point of 264°C., 273°C. and 135°C. respectively.

In Runs Nos. 1, 2, 10 and 11, the films used were not treated with corona discharge, and no bonding could be effected.

In Runs Nos. 3 and 4, the films were treated with corona discharge, but since the voltage was low, discharge hardly occurred. The contact angle of the film was also outside the range specified in the present invention, and the resulting bonded articles had a very low bond strength.

The bonded articles obtained in Runs Nos. 5, 6, 12 and 13 had a clear appearance, and when tested as to peel strength, the film assembly itself was delaminated without the breakage of the bonded surfaces.

Runs Nos. 8 and 14 did not give bonded articles because the heat-bonding temperature was too low.

In Run No. 7, the corona discharge treated film (having a contact angle of 41°) was bonded to the untreated film (having a contact angle of 69°). The bond strength of the resulting bonded article was somewhat inferior to that of the bonded article obtained in Run No. 6, but they were found to be firmly bonded to each other.

In Runs Nos. 9 and 15, the films were treated with a chemical instead of corona discharge. The films were immersed for 5 minutes in a solution consisting of 75 g of potassium bichromate, 120 g of water and 1500 g of conc.sulfuric acid, then washed with water, and dried in the air. No bonding could be effected.

A 25μ thick film (No. 16) of low density unstretched polyethylene (PE) was treated with corona discharge under the same conditions as in Run No. 5 to form a corona discharge treated film of Run No. 17. Two sheets of this film were heat bonded in the same way as in the case of PET and PEN. The film No. 16 which was not corona discharge treated was not bonded at all, and the film in Run No. 17 was slightly bonded but the bond strength was low.

2. A biaxially oriented polyethylene terephthalate film having a thickness of 100 μ was treated with corona discharge. The treeated surfaces of two sheets of the treated film were heat bonded by a heat sealer with a sealing width of 4 mm at a pressure of 4 Kg/cm² for 5 seconds.

Figure 4:
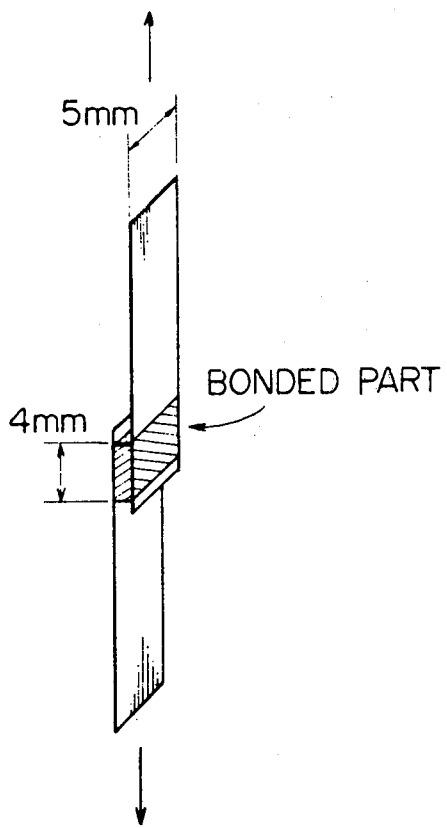

A rectangular test piece with a width of 5 mm as shown in FIG. 4 was prepared by cutting out from the bonded films at right angles to the sealed part. Using this test piece, the tensile shear strength was measured. The pulling speed was 100 mm/min. The results are shown in Table 2.

The same test was carried out using low density polyethylene films, and the results are also shown in Table 2. The bonded films in Run No. 19 according to this invention has high tensile shear strength.

Table 2

| Run No. | Film | Water contact angle (°) | Heat bonding temperature (°C.) | Shear strength (kg/cm²) | Remarks |
|---|---|---|---|---|---|
| 18 (Comp.) | PET | 69 | 200 | 0 | Not treated with corona discharge |
| 19 (Ex.) | " | 40 | 200 | 50 | |
| 20 (Comp.) | PE | 90 | 150 | 3 | Not treated with corona discharge |
| 21 (Comp.) | " | 46 | 150 | 2 | |

3. The peel strength of various films was measured in the same way as in Runs Nos. 1 to 17. The results are shown in Table 3. It is seen from the table that high bond strength can be obtained by the method of this invention.

Table 3

| | 1st shaped article | | 2nd shaped article | | Heat bonding temperature (°C.) | Peel strength (g/cm) | Remarks |
|---|---|---|---|---|---|---|---|
| Run No. | Material | Contact angle (°) | Material | Contact angle (°) | | | |
| 22 (Ex.) | PET 25μ (film used in Run No. 5) | 41 | PEN 25μ (film used in Run No. 12) | 39 | 200 | 370 | |
| 23 (Comp.) | ditto | 41 | ditto | 39 | 50 | 0 | |
| 24 (Ex.) | PET copolymer containing 5 mol % adipic acid (25μ film) | 39 | ditto | 39 | 200 | 380 | Tg 65°C. Tm 260°C. |
| 25 (Comp.) | ditto | 39 | ditto | 39 | 25 | 0 | |
| 26 (Ex.) | ditto | 39 | PET 25μ (film used in Run No. 5) | 41 | 190 | 360 | |
| 27 (Ex.) | PET/PEN=95/5 mol % blend (12μ film) | 40 | ditto | 40 | 210 | 250 | |
| 28 (Ex.) | PET/PEN=95/5 mol % blend (12μ film) | 40 | PET 25μ (film used in Run No. 5) | 70 | 210 | 220 | 2nd shaped article not treated with corona discharge |
| 29 (Ex.) | PET/Nylon 66 = 95/5 mol (20μ) | 38 | ditto | 38 | 150 | 300 | Tg 70°C. Tm 263°C. |
| 30 (Comp.) | ditto | 67 | ditto | 67 | 150 | 0 | Not treated with corona discharge |
| 31 (Ex.) | Polytetramethylene terephthalate (25μ) | 45 | ditto | 45 | 160 | 400 | Tg 30°C. Tm 225°C. |
| 32 (Comp.) | ditto | 72 | ditto | 72 | 160 | 0 | Not treated with corona discharge |

4. Run No. 33 (Example)

A 250 μ thick biaxially oriented polyethylene terephthalate film produced by a customary method was treated with corona discharge to adjust the contact angle of the film to 35°. The treated surfaces of two sheets of the treated film were superimposed and heat bonded by being passed through nip rolls consisting of a metal heated roll and a rubber roll. The temperature of the roll was 215°C. and the linear pressure was maintained at 10 Kg/cm². The resulting bonded film having a thickness of 500 μ was a completely integrated article, and no peeling from the bonded surfaces occurred in an Elemendorf tear test.

5. Run No. 34 (Example)

A 100 μ thick biaxially oriented film of polyethylene-2,6-naphthalate prepared by a customary method was treated with corona discharge to adjust the contact angle to 37°. A woven fabric having a thickness of about 100 μ composed of filaments spun from the same polyester as above by a customary manner was superimposed on the corona discharge treated surface of the film, and they were passed through the same nip rolls as in Run No. 33. The film was firmly bonded to the woven fabric.

6. Run No. 35 (Comparative Example)

Run No. 34 was repeated except that the film was not treated with corona discharge. The film was not bonded to the fabric.

What is claimed is:

1. A process for heat-bonding polyester films or sheet-like structures which comprises subjecting to a corona discharge treatment one or both surfaces of a polyester selected from the group consisting of polyethylene terephthalate and polyethylene-2,6-naphthalate, bringing the treated surface or surfaces into direct contact with the surface or surfaces which may be treated of another film or preformed sheet-like structure of said polyester and heat-bonding said films at a temperature from 70°C. higher than the glass transition temperature of the polyester to 10°C. lower than its melting point and an external pressure in the range of 0.01 to 20 Kg/cm$^2$, said corona discharge treatment being performed so that the treated structure has a contact angle of not more than $(\theta - 10°)$ and not less than $(\theta - 45°)$ wherein $\theta$ is the contact angle of the structure before treatment.

2. The method of claim 1 wherein said corona discharge treatment is performed so that the treated structure has a contact angle of not more than $(\theta - 5°)$ wherein $\theta$ is the contact angle of the structure before treatment.

3. The method of claim 1 wherein said polyester film or sheet-like structure is a biaxially oriented film or sheet-like structure.

* * * * *